United States Patent
Landers

[15] 3,691,584
[45] Sept. 19, 1972

[54] DISC SUPPORTED CUP
[72] Inventor: Don B. Landers, Arlington, Tex.
[73] Assignee: Oil States Rubber Co.
[22] Filed: Feb. 16, 1971
[21] Appl. No.: 115,590

[52] U.S. Cl. ..........................................15/104.06 R
[51] Int. Cl. .................................................B08b 9/06
[58] Field of Search .......15/104.06 R, 104.06 A, 3.5; 166/70, 153–155, 170, 202; 134/8

[56] References Cited

UNITED STATES PATENTS

| | | | |
|---|---|---|---|
| 2,480,358 | 8/1949 | Curtis et al. | ...15/104.06 R UX |
| 2,399,544 | 4/1946 | Danner | .........15/104.06 R UX |
| 3,480,984 | 12/1969 | Kidd | ....................15/104.06 R |

Primary Examiner—Edward L. Roberts
Attorney—Alexander & Dowell

[57] ABSTRACT

An elastomeric cup structure of the type wherein several cups are mounted on a supporting body or mandrel to form a pig to be passed through a pipeline, usually entrained in fluid flowing therethrough, either for the purpose of batch separation or for cleaning the pipeline. Each cup has a sealing lip supported by an annular flex portion attached to a cup base, and the cup further including a disc portion attached to the base adjacent to the flex portion and standing radially outwardly to contact the pipeline's inner surface and maintain the pig centered therein to relieve the sealing lips of this centering function. Several modifications of the cup structure include additional annular series of gussets for assisting the disc portion to remain substantially radially oriented.

8 Claims, 4 Drawing Figures

PATENTED SEP 19 1972
3,691,584
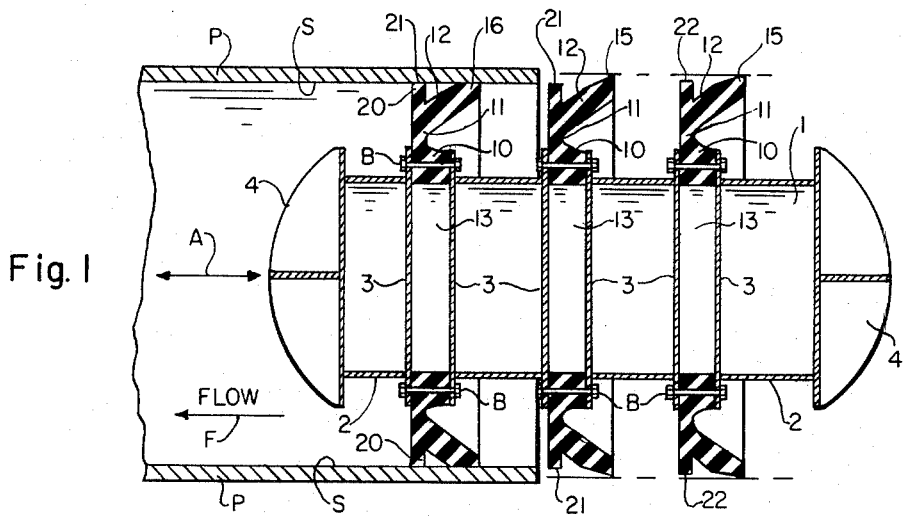
Fig. 1
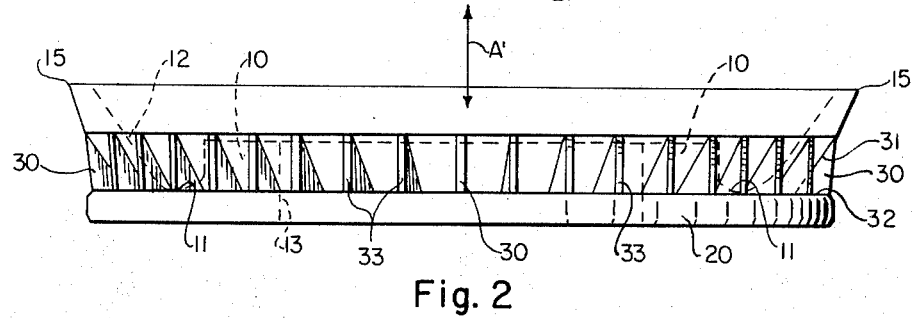
Fig. 2
Fig. 3
Fig. 4
INVENTOR.
DON B. LANDERS
BY Alexander & Dowell
ATTORNEYS

DISC SUPPORTED CUP

This invention relates to improvements in the structure of elastomeric cups of the type used as sealing elements on pipeline pigs, and more particularly relates to cup structures including means for centering the pigs in the pipelines to reduce the weight thereof carried by the sealing lips.

The prior art shows a number of pipeline pigs including elastomeric sealing elements having lip structures serving both to contact and wipe the internal surface of the pipeline and also to support the pig in substantially centered position therewithin. Typical examples of this type of structure are shown in U.S. Pat No. 2,953,800 to Bowerman, in U.S. Pat No. 3,480,984 to Kidd, in U.S. Pat. No. 3,496,588 to Ver Nooy, etc. In each of these patents, and in such other structures as are known to the applicant as part of the prior art, the sealing lip performs the dual function of sealing against the pipeline surface and of centering the pig in the pipeline. Frequently, the pipeline pigs are relatively large in diameter, perhaps 18 or more inches in the case of the larger examples, and therefore have considerable weight. When a pig passes through a pipeline, this weight causes greater wear on the portion of the lip of each sealing element or cup which is downwardly oriented. Unfortunately, the pig does not tend to rotate within the pipeline so as to distribute the wear evenly around the lip surfaces, and although many efforts have been made to provide a rotating pipeline pig, these efforts have not proven successful.

It is a principal object of this invention to provide an improved cup structure for pipeline pigs in which the sealing lip is relieved of this uneven wear by transferring the function of centering the pig within the pipeline to a newly added disclike portion which is supported on the same rubber base as the sealing lip and extends outwardly to independently contact the inner surface of the pipeline ahead of the sealing lip. Obviously, it is not possible to completely divorce the centering function and the sealing function, in view of the fact that with respect to any particular portion of the cup both wiping and centering can only be accomplished by contacting the surface of the pipeline. Contact made for the purpose of sealing also contributes to centering, and vice versa.

In an effort to separate the centering function and the sealing function as much as possible, the present disclosure teaches a structure in which the portion of the cup which is intended to perform primarily a centering function extends radially outwardly into contact with the surface of the pipeline, whereas the sealing lip is supported on the base of the cup by an elongated flex portion, the flex portion extending further from the base than the disc portion when measured along its length toward the sealing lip. This flex portion approaches at its outer surface an almost axial orientation where it joins the lip of the cup. Therefore, the length of the flex portion, especially when measured therealong to also include the lip portion, can be several times as long as the radial length of the newly added disc portion of this cup, but in any event it is substantially longer than the radial extent of the disc portion.

It is desirable that the rubber members comprising a part of a pipeline pig be flexible in order to permit the pig to distort so that it can pass restrictions in the diameter of the pipeline, discontinuities at joints and valves, short-radius curves in the pipeline, and corrosion type obstructions, anyone of which could block the forward progress of a non-flexible pig. It is therefore an important object of this invention to preserve the flexibility of the portions of the pig which extend outwardly from the base toward the inside surfaces of the pipeline. In order to accomplish this purpose, the flex portion is not only made long as it extends from the base of the cup to the lip to thereby allow the lip portion to displaced and distorted inwardly whenever necessary to permit the pig to pass an obstruction of one type or another in the pipeline, but it is a further important object of the invention to provide a cup structure in which the additional disc portion, added to the cup in order to help center the pig in the pipeline, is made more flexible by making it relatively thin in the axial direction. This is permissible because of the fact that, whereas it is the diagonal orientation of the flex portion of the cup that makes it relatively easy for the sealing lip to distort inwardly, in contradistinction to this diagonal orientation, the disc portion of the cup extends straight outwardly in a radial direction and therefore inward displacement of the disc portion is geometrically more difficult. Hence, the disc portion should be thick enough to normally support the cup, but thin enough to provide the disc portion with a capability to distort inwardly when an obstruction is encountered.

Another object of the invention, which applies to at least two forms of the cup shown in the present drawing, is to provide an additional thinner flex area located near the base of the cup and common to both of the outstanding cup portions, including the sealing lip portion and the centering disc portion. This common flex area adds to the flexibility of the cup and increases its ability to deflect away from the wall of the pipeline when an obstruction is encountered.

It is a further object of this invention to provide a cup in which the diameter of the centering disc portion is equal to, or only slightly larger than, the nominal internal diameter of the pipeline whereby contact with the pipeline surface is maintained substantially all the way around the disc, while at the same time permitting the disc portion to stand substantially outwardly in a radial direction, as distinguished from bending over away from the direction of flow in the manner of the longer flex portion and sealing lip portion of the cup.

Still another object of the invention is to provide a cup structure in which the centering disc portion has an outer surface which is substantially cylindrical so that it contacts the inner surface of the pipeline with a large area for the purpose of distributing the wear of that surface and reducing the unit-area contact pressure.

Another important object of the invention is to provide additional cup structures each including a centering disc portion which is reinforced by ribs located at circumferentially spaced intervals around the disc portion of the cup so as to increase the tendency of the latter to maintain a radial orientation as consistently as possible during travel of the cup through the pipeline. In one modification, the ribs appear as triangular gussets only on one side of the centering disc portion, whereas in another illustrated modification of the cup gussets are provided on both sides of the disc to further improve its tendency to maintain radial orientation. It should be noted that during normal use of a pipeline pig, its direction of travel may from time to time be reversed within the pipeline, and that the provision of rib-like gussets on both sides of the centering disc tends to improve the reversibility of the cup as well as the support of the disc portion in radial orientation.

The disclosure also recognizes that there may be advantage in having the ribs or gussets on one side of the centering disc displaced circumferentially from the positions of the ribs on the other side of the disc portion so that the ribs are not in longitudinal alignment with one another, thereby more evenly distributing the supporting action of the ribs without increasing the number thereof.

Other objects and advantages of the invention will become apparent during the following discussion of the drawings, wherein:

FIG. 1 is a sectional view showing a pig according to the present invention partially entered into a pipeline in the direction of flow therethrough;

FIG. 2 is an elevation view of a first modified form of cup structure according to the present invention, the cup being modified to show the addition of rib-like gussets between the flex portion and the disc portion of the cup;

FIG. 3 is an elevation view of a second modified form of the invention showing a cup having an axially longer base portion and having two sets of ribs or gussets for increasing the support of the centering disc portion; and FIG. 4 is a partial sectional view taken along the line 4—4 of FIG. 3.

Referring now to FIG. 1, this figure shows a typical pipeline P having an internal surface S intended to be wiped by a pipeline pig 1. The pig includes a body 2 comprising a series of short cylinders terminated by end plates 3 welded thereto. At each end of the pig 1 there is a rounded member 4 to assist the pig in glancing off of obstructions so as to help it proceed through the pipeline P in the direction of flow of the arrow F. The pig has an axis A which coincides with the axis of the pipeline, assuming that the pig is centered therein. The structure of the sheet metal members of the pig including the parts 2, 3, and 4 is only illustrative, and is merely intended to provided typical support for the elastomeric cups, these cups generally being supported at their central portions which are herein referred to as base portion.

The cup structure shown in FIG. 1 is typical of the main illustrative embodiment of the present invention and includes a central relatively heavy base portion 10 which has holes through it to receive bolts B holding the flange plates 3 tightly against the base portions of the cups when the pig is assembled as shown in FIG. 1. Although three elastomeric cup structures have been included in FIG. 1, it is to be understood that the number thereof is an optional variable, as is well known in the prior art. In the structure shown in FIG. 1, the base portion 10 is necked down to a relatively thin flexible portion 11, as measured in the axial direction of the cup structure. This portion in the vicinity of the reference numeral 11 is common both to the flex portion of the cup which joins the base portion 10 to the lip portion 15 and to the disc portion 20, described hereinafter. In the relaxed condition of the lip portion, its outer periphery is normally of greater diameter than the internal diameter of the pipeline as measured at the surface S, whereby the cup is distorted inwardly as a result of insertion in the pipeline as shown in the leftmost cup, for instance, at the reference numeral 16. To the left of each lip portion, the flex section extends inwardly along a relatively lengthy portion in the vicinity of the reference character 12, by virtue of its length and its diagonal orientation providing flexibility in the vicinity of the reference numeral 12 which is in addition to the flexibility found in the vicinity of the reference numeral 11. Thus, the flex section begins in the vicinity of the narrow arcuate portion 11 and extends through the diagonal portion 12, and finally assumes at its outer surface an almost axial position where it joins the lip portion 15 of the cup structure.

In addition to the lip portion of the cup structure, each cup also has a disc portion 20 which stands substantially radially outwardly from the base portion and has an outer surface 21 which abuts the inner surface S of the pipeline P. In the two left-most cups shown in Fig. 1, the disc portion 20 has an outer diameter which substantially equals the inside diameter of the pipeline at the surface S. However, the right-hand cup in FIG. 1 is slightly modified to show a disc portion having an outer surface 22 which extends slightly beyond the inner surface of the pipeline, but not as far out as the outer periphery of the lip portion 15. By making the diameter of the disc portion 22 slightly larger than the diameter of the surface S of the pipeline P it is possible to provide somewhat more material to wear away, while at the same time not making the diameter of the disc 22 great enough to cause the disc to be distorted significantly from its radial orientation which is considered geometrically desirable for the purpose of centering the pig.

Referring now to FIG. 2, this figure shows a modification in which most of the portions of the cup are identical to those shown in FIG. 1. The cup of FIG. 2 has a base portion 10 supporting a flex portion 12 and an outer lip portion 15. The cup also includes a disc portion 20 which is similar to lip portions shown in Fig. 1. The big difference between the structure of Fig. 1 and the modification of Fig. 2 resides in the provision of ribs 30 which are gussets of approximately triangular shape and include an inner edge 31 integrally bonded to the leading surface of the flex portion 12 of the cup having another edge 32 which is integrally bonded to the trailing edge of the disc portion 20 of the cup. The words leading and trailing refer to the cup when considered to be moving in the direction of flow indicated by the arrow F in Fig. 1. The modification as shown in Fig. 2 has an annular series of such ribs circumferentially spaced around the cup and made relatively thin as compared with the thickness of the disc portion 20 as measured in the axial direction of the cup indicated by the arrow A'.

The ribs 30 tend to increase the tendency of the lip portion 15 and the disc portion 20 of the cup to act in unison. Note that the axial length of the cup including the disc and lip portions is approximately the same as the radial extent of the cup as measured from the outer periphery of the base portion, and therefore the cup has an effective pipeline-contacting bearing surface tending to keep the lip and disc portions lying on the cylindrical surface S. However, because of the flexibility of the cup in the vicinity of the reference numeral 11, Fig. 1, the outer lip and disc portion of the cup can be deflected as a unit if it should encounter an obstruction in the pipeline, this feature helping the cup to resist severe damage during use. The outer edges 33 of the ribs will also lie against the inner surface S of the pipeline, and contribute to the centering tendency by which wear is reduced at the lip 15 of the cup.

Figs. 3 and 4 show a third of the cup which is modified with relation both to the versions shown in Fig. 1 and in Fig. 2. Considered upwardly from the disc portion 20 in Fig. 3, the cup is the same as shown in Fig. 2 and includes the ribs 30 and the lip and disc portions, all attached to a base portion 10. However, the base of the cup shown in FIGS. 3 and 4 is not the same as the base 10 in Figs. 1 and 2, but has been extended in the axial direction to provide a portion 41 which extends below the disc portion 20 as viewed in Fig. 4. The extension of the base in this direction provides a surface 42 upon which an additional series of ribs or gussets 45 can be supported. These ribs have one edge bonded to the outer base surface 42 and have another edge bonded to the leading edge of the disc portion 20 as shown at 46 in Fig. 4. As mentioned above in the specification, the ribs 45 can either be in axial alignment with the ribs 30, or they can be circumferentially displaced with respect thereto, which ever is deemed more desirable in the design of the cup.

As shown in the illustrative embodiments, the base portion of each of the cups has an opening extending therethrough, for instance at 48 in Fig. 4 or at 13 in Figs. 1 and 2. This opening can be sized to receive a solid mandrel where such type of mounting is used, for instance a mandrel as shown in the above mentioned U.S. Pat. No. 3,480,984 to Kidd. In the present embodiment, the mounting bolts B are passed through suitable holes 43 in the base portion of the cup, Fig. 4.

The present invention is not to be limited to the exact forms shown in the drawing, for obviously changes may be made therein the scope of the following claims.

I claim:

1. An improved structure for an elastomeric cup for mounting on a supporting body to form a pig intended to be passed through a pipeline, said cup structure having an outer diameter which is much greater than its axial length and comprising:
   a. a base portion located radially inwardly of the cup and adapted to be secured to the supporting body;
   b. an annular sealing lip portion comprising the outer periphery of the cup structure and of diameter at least as great as the inner diameter of the pipeline;
   c. an annular flex portion extending initially radially from the base portion and then curving to extend diagonally outwardly along an elongated flex portion which joins the lip portion; and
   d. a disc portion joined to the flex portion and standing radially outwardly with respect to the base portion sufficiently to normally contact the pipeline when the pig is entered thereinto and maintain the latter centered therein, the axial length of the cup which contacts the pipeline and includes the disc and lip portions approximately equalling the radial extent of these portions as measured from the outer periphery of the base portion.

2. In a cup structure as set forth in claim 1, the elastomeric material in the diagonally extending part of said flex portion being of substantially greater thickness than the thickness of the elastomeric material in said disc portion as measured axially of the cup.

3. In a cup structure as set forth in claim 1, the diameter of the lip portion being greater than the nominal inside diameter of the pipeline, and the diameter of the disc portion being substantially equal to said nominal inside diameter when the elastomeric cup is in relaxed condition.

4. In a cup structure as set forth in claim 1, the diameter of the lip portion and of the disc portion each being greater than the nominal inside diameter of the pipeline when the elastomeric cup is in relaxed condition.

5. In a cup structure as set forth in claim 1, the outer peripheral surface of the disc portion comprising a cylindrical bearing surface for contacting the pipeline.

6. In a cup structure as set forth in claim 1, the flex portion and the disc portion being united near the base portion and separating as they extend outwardly from the base portion, the thickness of the elastomeric cup material as measured substantially axially of the cup being similar in the disc portion and in the flex portion near the base where the flex portion joins it.

7. In a cup structure as set forth in claim 1, wherein the flex portion and the disc portion of the cup diverge as they approach their respective outer peripheries, an annular series of circumferentially spaced ribs, each comprising an elastomeric gusset set disposed axially of the cup and having one edge joining the disc portion and an adjacent edge joining the flex portion of the cup.

8. In a cup structure as set forth in claim 7, the base portion of the cup extending axially beyond the disc portion on the side thereof opposite the flex portion, and a second annular series of circumferentially spaced ribs, each comprising an elastomeric gusset disposed axially of the cup and having one edge joining the disc portion and an adjacent edge joining the base portion where it extends beyond the disc portion.

* * * * *